(12) United States Patent
Tomescu et al.

(10) Patent No.: US 7,107,478 B2
(45) Date of Patent: Sep. 12, 2006

(54) DATA PROCESSING SYSTEM HAVING A CARTESIAN CONTROLLER

(75) Inventors: Dan Tomescu, Richmond Hill (CA); Gheorghe Stefan, Manchester, NH (US)

(73) Assignee: Connex Technology, Inc., Los Gatos, CA (US)

( * ) Notice: Subject to any disclaimer, the term of this patent is extended or adjusted under 35 U.S.C. 154(b) by 331 days.

(21) Appl. No.: 10/728,234

(22) Filed: Dec. 4, 2003

(65) Prior Publication Data

US 2004/0123073 A1 Jun. 24, 2004

Related U.S. Application Data

(60) Provisional application No. 60/431,154, filed on Dec. 5, 2002.

(51) Int. Cl.
*G06F 1/04* (2006.01)
*G06F 9/40* (2006.01)

(52) U.S. Cl. .......................... 713/600; 712/36; 712/215

(58) Field of Classification Search .................. 712/25, 712/27, 36, 206, 215; 713/400, 500, 600
See application file for complete search history.

(56) References Cited

U.S. PATENT DOCUMENTS

| | | | |
|---|---|---|---|
| 4,575,818 A | 3/1986 | Almy et al. | |
| 4,780,811 A | 10/1988 | Aoyama et al. | |
| 4,907,148 A | 3/1990 | Morton | |
| 4,983,958 A | 1/1991 | Carrick | |
| 5,122,984 A | 6/1992 | Strehler | |
| 5,150,430 A | 9/1992 | Chu | |
| 5,319,762 A | 6/1994 | Mayer | |
| 5,329,405 A | 7/1994 | Hou et al. | |
| 5,373,290 A | 12/1994 | Lempel et al. | |
| 5,440,753 A | 8/1995 | Hou et al. | |
| 5,448,733 A | 9/1995 | Satoh et al. | |
| 5,497,488 A | 3/1996 | Akizawa et al. | |
| 5,602,764 A | 2/1997 | Eskandari-Gharnin | |
| 5,640,582 A | 6/1997 | Hays et al. | |
| 5,758,176 A | 5/1998 | Agarwal | |
| 5,818,873 A | 10/1998 | Wall et al. | |
| 5,828,593 A | 10/1998 | Schultz et al. | |
| 6,089,453 A | 7/2000 | Kayser et al. | |

(Continued)

FOREIGN PATENT DOCUMENTS

GB 2230119 A 10/1990

(Continued)

OTHER PUBLICATIONS

Mitu et al., "A CMOS Implementation of a Connex Memory," pp. 579-582, IEEE, 1997.

(Continued)

*Primary Examiner*—Dennis M. Butler
(74) *Attorney, Agent, or Firm*—McCormick, Paulding & Huber LLP

(57) ABSTRACT

A data-processing system includes a data device for selectively storing data and an engine having access to the memory device, the engine supporting a plurality of machine executable programs. A controller is utilized which selectively outputs one of a plurality of instructions to the engine for driving the execution of the programs enabled by the engine, while a clock device is utilized for outputting a synchronizing clock signal comprised of a predetermined number of clock cycles per second. The clock device outputs the synchronizing clock signal to the data device, the engine and the controller. The controller outputs one of the instructions to the engine for execution of one of the programs, while also executing an operation within itself, all within a single clock cycle.

20 Claims, 1 Drawing Sheet

U.S. PATENT DOCUMENTS

| | | | |
|---|---|---|---|
| 6,145,075 | A | 11/2000 | Henry et al. |
| 6,295,534 | B1 | 9/2001 | Mann |
| 6,317,819 | B1 | 11/2001 | Morton |
| 6,405,302 | B1* | 6/2002 | Ohsuga et al. ............... 712/35 |
| 6,542,989 | B1 | 4/2003 | Duranton |
| 6,772,268 | B1* | 8/2004 | Kristiansen et al. ........ 710/308 |
| 7,013,302 | B1* | 3/2006 | Modelski et al. ............. 707/10 |
| 2003/0041163 | A1* | 2/2003 | Rhoades et al. ............ 709/232 |

FOREIGN PATENT DOCUMENTS

| | | |
|---|---|---|
| WO | WO 01/33352 A1 | 5/2001 |
| WO | WO 01/53933 | 7/2001 |

OTHER PUBLICATIONS

Stefan, Gheorghe, "Silicon or Molecules? What's the Best for Splicing?", Technical Univ. of Bucharest, Dept. of Electronics, pp. 158-181, 1998.

Stefan, Gheorghe, The Connex Memory. "A Physical Support for Tree/List Processing", Technical Univ. of Bucharest, Dept. of Electronics, pp. 1-22, 1994.

Stefan, Gheorghe and Benea, Robert, "Connex Memories & Rewriting Systems", Politehnica Univ. of Bucharest, Dept. of Electronics, pp. 1299-1303, 1998.

Stefan, Denisa and Stefan, Gheorghe, "Bi-thread Microcontroller as Digital Signal Processor", 1997 IEEE.

Hascsi, Zoltan, Mitu, Bogdan, Petre, Mariana and Stefan, Gheorghe, "High-Level Synthesis of an Enhanced Connex Memory" 1996 IEEE, pp. 163-166.

Stefan, G. and Dragnici, F., "Memory Management Unit With a PerformantLRU Circuit" Polytechnic Institute of Bucharesi, pp. 89-96, Jan. 1991.

Thiebaut, Dominique and Stefan, Gheorghe, "Local Alignments of DNA Sequences with the Connex Engine" pp. 1-12, Sep. 2001.

Stefan, Gheorghe and Malita, Mihaela, "The Splicing Mechanism and the Connex Memory" Technical Univ. of Bucharest, Dept. of Electronics; Univ. of Bucharest, Fac. of Mathematics, pp. 225-229, 1997.

Hascsi, Zoltan and Stefan, Gheorghe, "The Connex Content Addressable Memory (C2AM)" "Politehnica" University of Bucharest, Electronics & Telecommunications Dpt., pp. 422-425, Sep. 1995.

Shaw D E et al: "Active Memory Chip: A Brief Survey And Case Study" Circuits, Systems And Signal Processing, Cambridge, MS, US, vol. 6 No. 2, 1987 pp.239-258. XP000747239.

Intel, Intel Architecture Software Developer's Manual—vol. 1: Basic Architecture, Chpt. 4, "Procedure Calls, Interrupts, and Exceptions".

Shaw, David E. et al., Active Memory Chips: A Brief Study and Case Study, Circuits Systems Signal Process, vol. 6, No. 2, 1987.

Berrached, Ali et al., A Decoupled Access/Execute Architecture for Efficient Access of Structured Data, PA State University, 1993 IEEE.

* cited by examiner

DATA PROCESSING SYSTEM HAVING A CARTESIAN CONTROLLER

CROSS REFERENCE TO RELATED APPLICATIONS

This application claims priority to U.S. Provisional Application No. 60/431,154 entitled "ENHANCED VERSION OF CONNEX MEMORY", and filed on Dec. 5, 2002, hereby incorporated by reference in its entirety. The subject matter of this application relates to pending U.S. patent application Ser. No. 09/928,151 entitled "A MEMORY ENGINE FOR THE INSPECTION AND MANIPULATION OF DATA", filed on Aug. 10, 2001 and U.S. patent application Ser. No. 10/727,811 entitled "CELLULAR ENGINE FOR A DATA PROCESSING SYSTEM", filed Dec. 4, 2003, both of which are herein incorporated by reference in their entirety.

FIELD OF THE INVENTION

The invention relates generally to a data processing system having a controller, and more particularly, to a data processing system having a controller which acts as a stack-oriented processor and, in one embodiment, is capable of driving the execution of the Connex Engine (CE) and thus the operation of the Connex Memory (CM) contained therein.

BACKGROUND OF THE INVENTION

Controllers are utilized in many, if not all, complex computerized systems. Typically, these controllers take the form of known processors, or the like, for controlling the sequential operation of those components or devices which are in communication with the controller.

In such systems, it is oftentimes necessary for large amounts of data to be processed, searched or otherwise manipulated in short timeframes. Typically, the speed at which these operations are executed can be increased by configuring the overall system such that the controlled components each operate in parallel with one another. That is, instructions from the controller in such systems are carried out by the various components of the system in parallel every cycle, thus saving time and increasing the efficiency of the system.

There exists, however, certain inherent inefficiencies in the operation of known processor-controlled systems. Perhaps most significantly, known processor-controlled systems exhibit significant 'down-time' when required to not only issue instructions to those components connected in parallel, but also to execute basic routines within the controller itself. That is, known processor-controlled systems are incapable of executing operations within themselves while also seeing to the parallel execution of instructions in their integrated components, all within a common time-frame.

With the forgoing problems and concerns in mind, the present invention therefore seeks to utilize a data processing system having a new type of controller termed a Cartesian Controller (CC) which is capable of issuing instructions for the parallel execution of these instructions in controlled devices, as well as performing operations within itself, all within a single clock cycle.

SUMMARY OF THE INVENTION

It is an object of the present invention to provide an efficient data processing system.

It is another object of the present invention to provide an efficient data processing system which is capable of issuing instructions to a plurality of controlled devices.

It is another object of the present invention to provide an efficient data processing system which is capable of ensuring that instructions are executed within a plurality of controlled devices in parallel with one another.

It is another object of the present invention to provide an efficient data processing system which is capable of performing internal operations as well as issuing instructions to a plurality of controlled devices.

It is another object of the present invention to provide a controller for an efficient data processing system which is capable of performing internal operations as well as issuing instructions to a plurality of controlled devices, whereby the internal operations of the controller and the parallel processing in the controlled devices are both accomplished within every clock cycle.

According to one embodiment of the present invention, a data-processing system for the selective manipulation of data includes a cellular data processing engine A controller is utilized which selectively outputs one of a plurality of instructions to the cellular engine for driving the execution of the programs enabled by the engine, while a clock device is utilized for outputting a synchronizing clock signal comprised of a predetermined number of clock cycles per second. The clock device outputs the synchronizing clock signal to the cellular engine and the controller. The controller outputs one of the instructions to the cellular engine for execution of one of the programs, while also executing an operation within itself, all within a single clock cycle.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
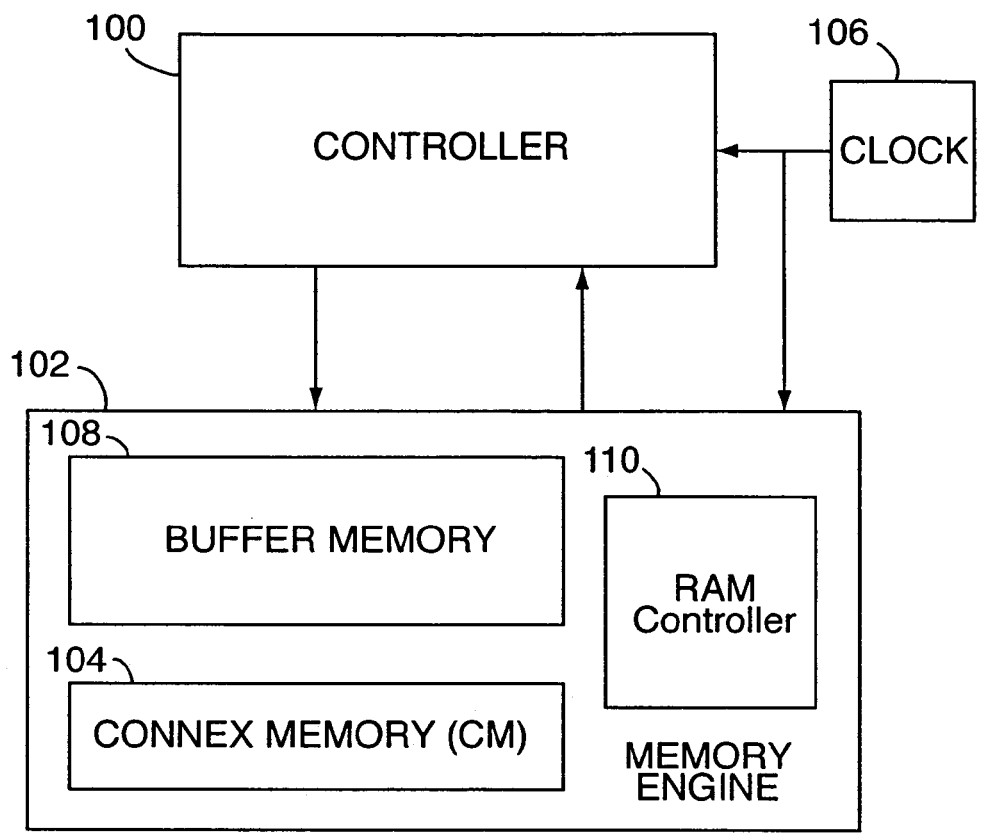
FIG. 1 is a block diagram showing the general architecture of a Cartesian Controller, including a memory engine and a synchronizing clock element, according to one embodiment of the present invention.

FIG. 1 depicts the architectural relationship between a Cartesian Controller (CC) 100 as it relates to a data processing engine 102, hereinafter referred to as the Connex Engine (CE), and an array of active cells, or processing elements, 104, hereinafter referred to as the Connex Memory (CM), supported therein. A synchronizing clock circuit 106 is utilized to coordinate the operation of the CC 100, the CE 102 and the CM 104 such that one of a plurality of instructions may be issued by the CC 100 and transferred to the CE 102 and the CM 104 for parallel execution and processing.

The clock circuit 106 is capable of outputting a predetermined number of clock cycles per second, and the CC 100 is capable of performing an internal operation such that the CC 100 performs one of a plurality of internal operations while also issuing one of a plurality of instructions to the CE 102 within a single clock cycle. A buffer memory 108 and a RAM controller 110 are also shown.

The buffer memory 108 is organized as a pool of buffers, each preferably having a size equal to the size of the CM 104, and which is under the control of the CE 102. The purpose of these buffers, also referred to as lines, is to allow for search, insert and delete operations, amongst other operations, to be performed on character strings longer than may be accommodated within the CM 104, and thus offering a lower cost of implementation and a reduction in power dissipation.

It will be readily appreciated that the present invention contemplates that the CC 100 may have any number of circuit-specific configurations without departing from the broader aspects of the present invention provided that the CC 100 is capable of issuing commands to, and receiving data from, the CE 102.

In accordance with the preferred embodiment of the present invention, the CC 100 is a 32-bit stack-oriented processor which is capable of driving the execution of programs enabled in the CE 102. The CE 102 is itself a data-parallel machine, also known as a SIMD (Single Instruction Multiple Data) machine. The code that the CE 102 executes is sequential, but the operation specified by each instruction that the CE 102 gets from the CC 100 is executed in parallel by all cells in the CM 104 within one clock cycle. That is, the code of an operation like "find" is fed into a plurality of available cells that all do their work strictly in parallel, independently of each other.

While the present invention has been described as enabling the parallel execution within the CE 102, the present invention is not so limited in this regard as other machines and devices may be alternatively attached so as to be in communication with the CC 100, without departing from the broader aspects of the present invention. That is, the present invention envisions that other devices apart from, or instead of, the CE 102, may be controlled in parallel, stemming from instructions issued by the CC 100, all within a single clock cycle.

Returning to FIG. 1, the CE 102 does not itself have access to a program memory to fetch its instructions—every cycle its cells expect to get an operation code in a special register, but it takes a different entity, in the present case, the CC 100, to do it for them; the code is sequential and there needs to be a single point of access to fetch it. The main job of the CC 100 is therefore to drive the execution of CE 102 programs, i.e. fetch instructions to be executed by individual cells and place them in an internal register; at the same time, it serves as a gateway to CE 102 and thereby takes care of all input/output interactions. The CC 100 also executes simple sequential operations without which it would be impossible to write meaningful code for such a machine: one class of such operations are the so-called "control primitives", i.e. those instructions that are used to code decision-making sequences (e.g. if, while, repeat, etc).

While a sequential controller is typically utilized to drive the execution of code for data-parallel machines, known architectures utilize one of the two following solutions in the implementation of their respective controllers:

1. A conventional processor, such as an off-the-shelf chip, like an ARM® controller or an Intel® processor. The efficiency of this solution is not optimal because when these controllers execute their own instructions, the parallel machine(s) to which they are connected are idle. That is, known conventional processors are not capable of fetching instructions for their connected parallel machines, while also executing their own instructions; and 2. A microprogrammed machine using a plurality of microinstruction fields to issue commands to a set of devices. The efficiency of this solution is not optimal because of the difficulty of coordinating the parallel execution of two independent instructions belonging to different instruction sets that are both implemented in microcode.

It is therefore an important aspect of the present invention that the CC 100, which was designed and optimized with the CE 102 and the CM 104 in mind but can also serve to control other machines, implements an instruction pipeline that allows for the parallel execution of two types of instructions per clock cycle: one for the CE 102, and another for the CC 100 itself.

As will be appreciated, by enabling the execution of two types of instructions within each clock cycle, the CC 100 is capable of performing data handling operations in a much more efficient and time sensitive manner. In particular, the CC 100 is capable of controlling the execution of code belonging to two different instruction sets in a single clock cycle, whereas known sequential controllers and their parallel machines take two, or more, clock cycles to accomplish the same tasks.

The CC 100 has a RISC architecture and, as mentioned previously, is capable of performing an internal operation while also generating a corresponding operation within the CE 102, all within a single clock cycle. The instruction for both of the operations in the CC 100 and the CE 102 is thus encoded in each instruction of the CC 100.

In a preferred embodiment of the present invention, the following resources are part of the structure of the CC 100, which is a stack-based machine:

1. A control unit, whose main components are a program memory and a control stack;

2. An execution unit, whose main components are a data memory, a data stack and a logic and arithmetic unit;

3. An I/O unit, whose main components are two FIFOs; and

4. A co-machine interface, containing mainly drivers and receivers.

Instruction Set for the CC 100

Figure 2:
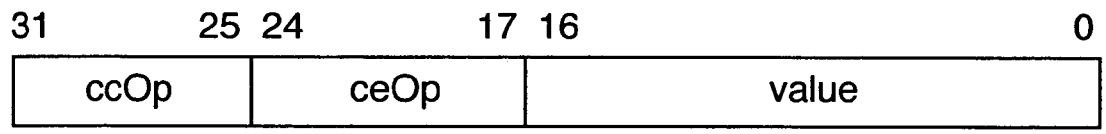
FIG. 2 exhibits the instruction format for the Cartesian Controller.

FIG. 2 illustrates the format of CC 100 instructions, in which the system performs, in parallel, an instruction in the CE 102, as encoded in the ceOp field, as well as an instruction in the CC 100, as encoded in the ccOp field.

Instructions include the following fields: ccOp, located in instr[31:25], is an operation code for the CC 100; ceOp, located in instr[24:17], is an operation code for the CE 102 (sent to the CE 102 and executed in parallel with the instruction encoded in the ccOp field); value, located in instr[16:0], is an immediate operand for either instruction, which may be utilized for both instructions, if desired.

Instructions implemented by the preferred embodiment of the CC 100 fall into the following categories:

1. Arithmetic and logic instructions;
2. Data transfer instructions;
3. Stack instructions, including:
   a. remove <num>, which pops a number of values equal to the num operand off the top of the data stack by subtracting the value of num from the data stack pointer;
   b. restore, which restores the value of the stack pointer to what it was before the last execution of the remove instruction;

c. pushframe <num>, which pushes a number of words equal to the num operand onto the control stack by adding the num value to the control stack pointer. Note that the contents of the newly pushed control stack frame are undefined; and d. popframe <num>, which pops a number of words equal to the num operand off the top of the control stack by subtracting the num value from the control stack pointer.

4. Stack interchange instructions, including:
   a. xchg, which which swaps the top values of the data stack and control stack respectively;
   b. cs2ds, which pops a value off the top of the control stack and pushes it onto the data stack;
   c. ds2cs, which pops a value off the top of the data stack and pushes it onto the control stack; and
   d. pushcs <nuin>, which pushes onto the data stack a control stack value whose offset relative to the control stack pointer is given by the num operand.

5. Control instructions;

6. Wait instructions, of the form 'w event', which take one or more cycles to complete. Within each cycle of a wait-type instruction a certain Boolean condition called event is evaluated; if the truth value of the event is true, then the CC program counter is incremented; otherwise the program counter remains unchanged, the consequence being that the same condition will also be tested within the following clock cycle. Some of the events associated with wait-type instructions in the preferred embodiment of the CC 100 are:
   a. zero: the top of the data stack is compared to zero and if not equal to zero it is decremented, otherwise the top data stack value is removed;
   b. noMarker: a flag set by the control system, i.e., the CE 102 in the preferred embodiment of the CC 100;
   c. noFullOut: a flag which, if true, indicates that the output FIFO is ready to accept new data; and
   d. noEmptyIn: a flag which, if true, indicates that the input FIFO contains at least one word of data.

7. Test instructions;
8. Conditional jump instructions; and
9. I/O instructions.

Although the preceding list offers instructions implemented by the preferred embodiment of the CC 100 in specified categories, it will be readily appreciated that the CC 100 may implement other, additional instructions in non-specified categories without departing from the broader aspects of the present invention. Indeed the preceding list is offered by way of explanation and example and should not be construed as exhaustive even within the categories listed above.

While the invention had been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A data-processing system, said data-processing system comprising:
   a data device for selectively storing data;
   an engine having access to said memory device, said engine supporting a plurality of machine executable programs therein;
   a controller which selectively outputs one of a plurality of instructions to said engine for driving the execution of said plurality of machine executable programs;
   a clock device for outputting a synchronizing clock signal comprised of a predetermined number of clock cycles per second, said clock device outputting said synchronizing clock signal to said data device, said engine and said controller; and
   wherein said controller outputs one of said instructions to said engine for execution of one of said plurality of machine executable programs, while also executing an operation within itself, all within one of said clock cycles.

2. The data processing system according to claim 1, wherein:
   said data device is an associative data device having n-cells.

3. The data processing system according to claim 2, wherein:
   each of said n-cells in said associative memory device includes a processing circuit.

4. A data-processing system for the selective manipulation of data, said data-processing system comprising:
   a memory device for storing said data;
   an engine having access to said memory device, said engine supporting a plurality of machine executable programs therein;
   a controller which selectively outputs one of a plurality of instructions to said engine for driving the execution of said programs enabled by said engine;
   a clock device for outputting a synchronizing clock signal comprised of a predetermined number of clock cycles per second, said clock device outputting said synchronizing clock signal to said memory device, said engine and said controller; and
   wherein said controller outputs one of said instructions to said engine for execution of one of said programs, while also executing an operation within itself, all within a single clock cycle.

5. The data processing system of claim 4, wherein:
   said controller includes an execution unit and an integrated data stack having a data stack pointer.

6. The data processing system of claim 5, wherein:
   one of said plurality of instructions issued by said controller is a 'remove' command whereby a value communicated with said 'remove' command is subtracted from said data stack pointer, thereby popping a number of values equal to said value off the top of said data stack.

7. The data processing system of claim 6, wherein:
   one of said plurality of instructions issued by said controller is a 'restore' command whereby said value communicated during a most recent execution of said 'remove' command is added to said data stack pointer, thereby restoring said data stack pointer to its initial position prior to said execution of said 'remove' command.

8. The data processing system of claim 5, wherein:
   said controller further includes a control stack and a control stack pointer.

9. The data processing system of claim 8, wherein:
   one of said plurality of instructions issued by said controller is a 'pushframe' command whereby a value communicated with said 'pushframe' command is added to said control stack pointer, thereby pushing a number of words equal to a number communicated with said 'pushframe' command onto the top of said control stack.

10. The data processing system of claim 8, wherein:
one of said plurality of instructions issued by said controller is a 'popframe' command whereby a value communicated with said 'popframe' command is subtracted from said control stack pointer, thereby popping a number of values equal to said value off the top of said control stack.

11. The data processing system of claim 8, wherein:
one of said plurality of instructions issued by said controller is a 'xchg' command whereby a top value of said data stack is switched with a top value of said control stack.

12. The data processing system of claim 8, wherein:
one of said plurality of instructions issued by said controller is a 'cs2ds' command whereby a top value of said control stack is pushed onto said data stack.

13. The data processing system of claim 8, wherein:
one of said plurality of instructions issued by said controller is a 'ds2cs' command whereby a top value of said data stack is pushed onto said control stack.

14. The data processing system of claim 8, wherein:
one of said plurality of instructions issued by said controller is a 'pushcs' command whereby a value of said control stack is pushed onto said data stack; and
wherein said value reflects an offset position relative to said control stack pointer, said offset position being equivalent to an amount communicated with said 'pushcs' command.

15. The data processing system of claim 8, wherein:
one of said plurality of instructions issued by said controller is a multi-cycle 'wait zero' command whereby a top value of said data stack is compared to zero during one of said clock cycles;
wherein if said top value of said data stack is equal to zero, said top value of said data stack is removed and a program counter is incremented and a subsequent instruction may be executed; and
wherein if said top value of said data stack is not equal to zero, said program counter remains unchanged and said 'wait zero' command is repeated in a subsequent clock cycle.

16. The data processing system of claim 8, wherein:
one of said plurality of instructions issued by said controller is a 'wait noMarker' command whereby an internal binary flag indicated by said 'wait noMarker' instruction is compared to zero during one of said clock cycles;
wherein if said internal binary flag is equal to zero, a program counter is incremented and a subsequent instruction may be executed; and
wherein if said internal binary flag is not equal to zero, said program counter remains unchanged and said 'wait noMarker' command is repeated in a subsequent clock cycle.

17. The data processing system of claim 8, wherein:
one of said plurality of instructions issued by said controller is a 'wait noFullOut' command whereby it is determined, during one of said clock cycles, if an output queue is full;
wherein if said output queue is not full, a program counter is incremented and a subsequent instruction may be executed; and
wherein if said output queue is full, said program counter remains unchanged and said 'wait noFullOut' command is repeated in a subsequent clock cycle.

18. The data processing system of claim 8, wherein:
one of said plurality of instructions issued by said controller is a 'wait noEmptyIn' command whereby it is determined, during one of said clock cycles, if an input queue is empty;
wherein if said output queue is not empty, a program counter is incremented and a subsequent instruction may be executed; and
wherein if said input queue is empty, said program counter remains unchanged and said 'wait noemptyn' command is repeated in a subsequent clock cycle.

19. A data-processing system for the selective manipulation of data, said data-processing system comprising:
an associative memory device for storing said data;
an engine having access to said memory device, said engine supporting a plurality of machine executable programs therein;
a controller which selectively outputs one of a plurality of instructions to said engine for driving the execution of said programs enabled by said engine;
a clock device for outputting a synchronizing clock signal comprised of a predetermined number of clock cycles per second, said clock device outputting said synchronizing clock signal to said associative memory device, said engine and said controller; and
wherein said controller outputs one of said instructions to said engine for execution of one of said programs, while also executing an operation within itself, all within a single clock cycle.

20. A method of processing data, said method of processing data comprising the steps of:
storing data in a data device;
providing an engine in communication with said memory device, said engine supporting a plurality of machine executable programs therein;
providing a controller which selectively outputs one of a plurality of instructions to said engine for driving the execution of said plurality of machine executable programs;
outputting a synchronized clock signal having a predetermined number of clock cycles per second to said data device, said engine and said controller; and
outputting one of said plurality of instructions to said engine, and executing one of said plurality of machine executable programs, all within one of said clock cycles.

* * * * *